MELVIN L. BAKER
INVENTOR.

Dec. 6, 1966  M. L. BAKER  3,290,590
ELECTRICAL SIGNAL ANALYZING SYSTEMS
Filed June 29, 1960  5 Sheets-Sheet 2
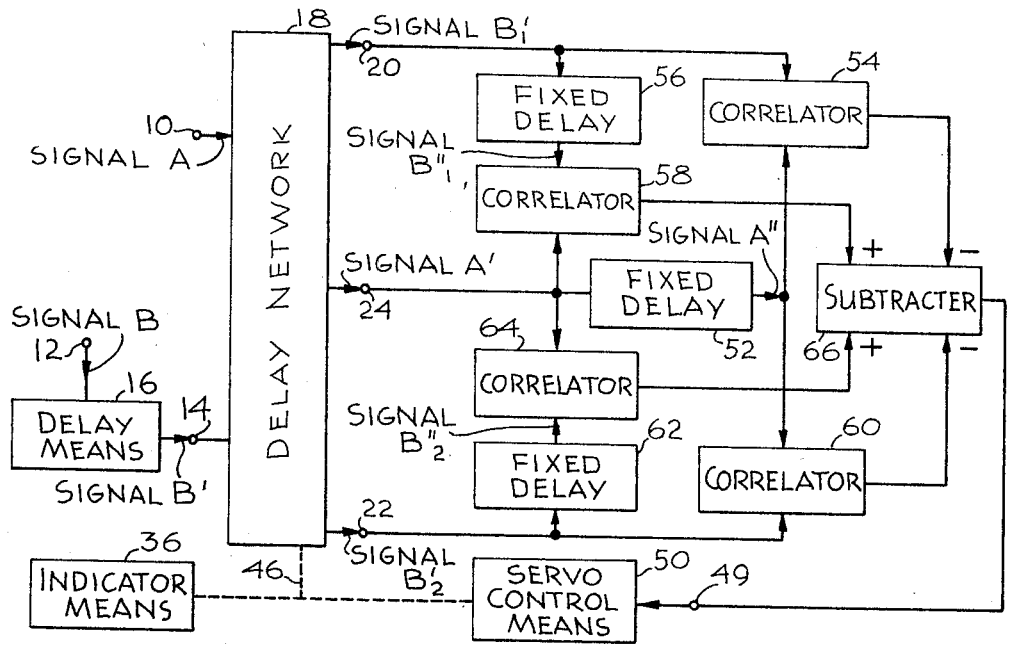
Fig. 4
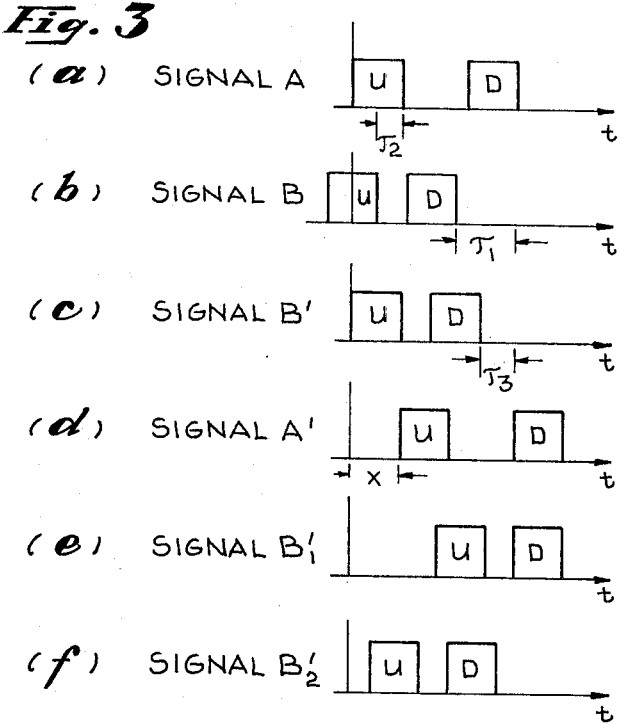
MELVIN L. BAKER
INVENTOR.
BY
ATTORNEY

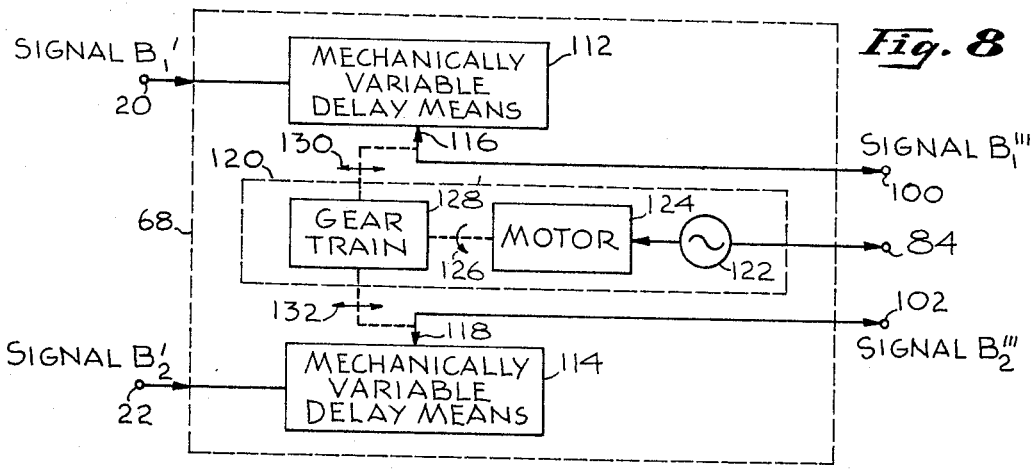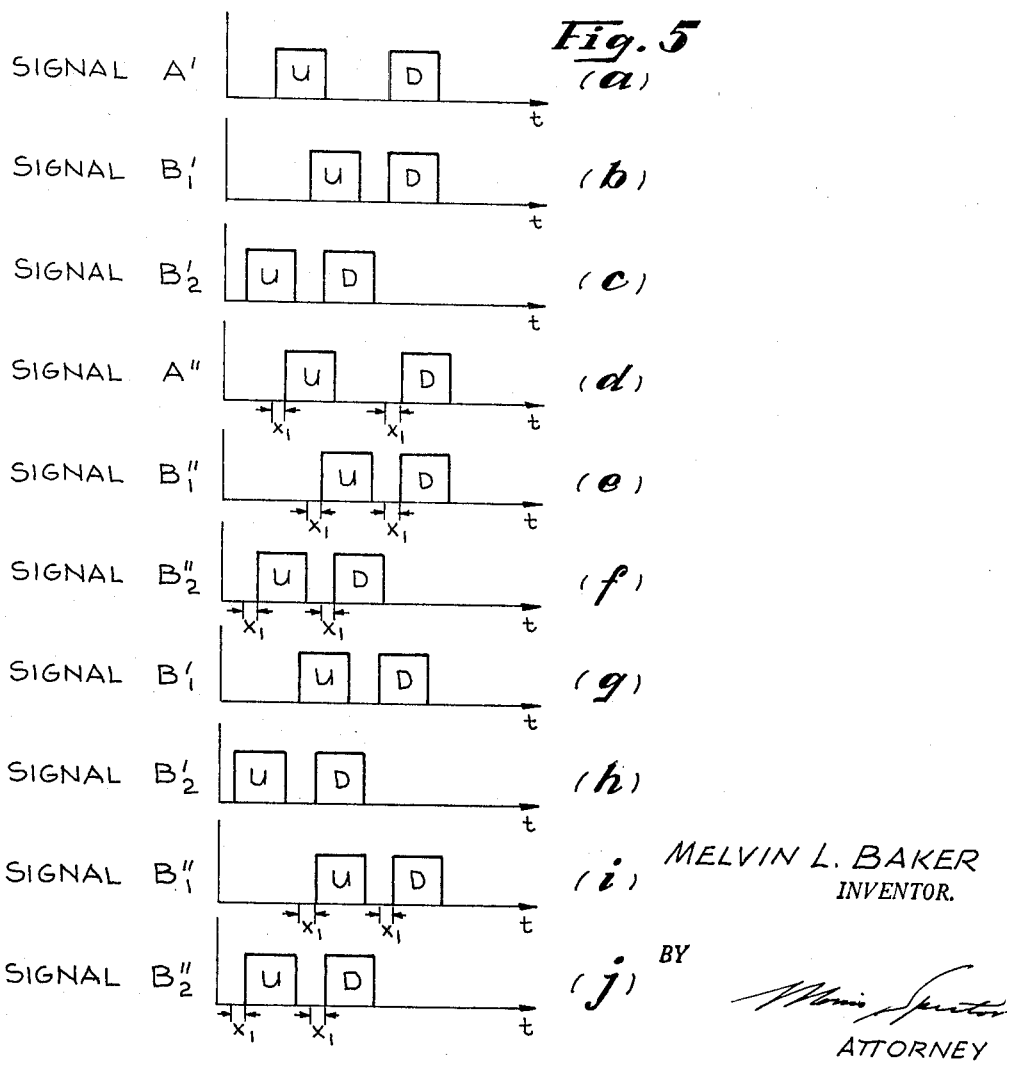

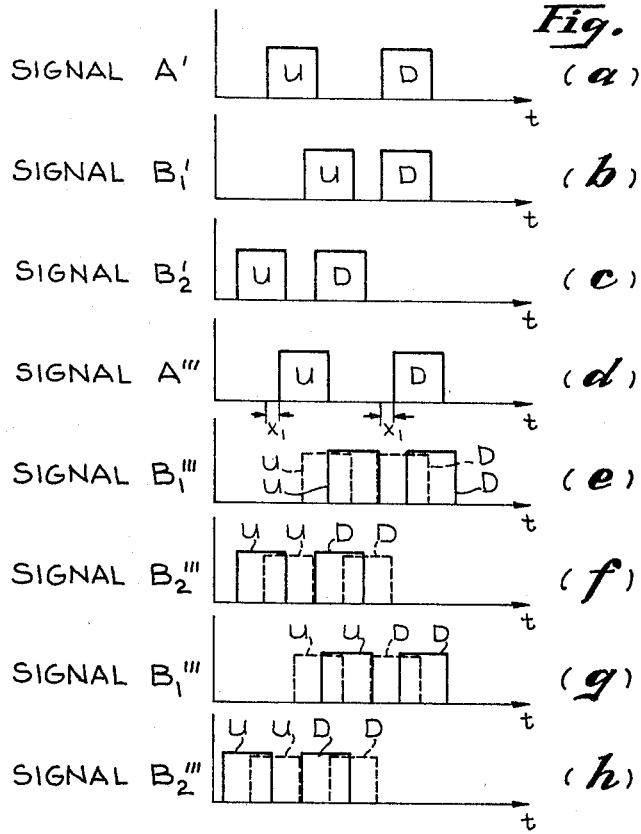

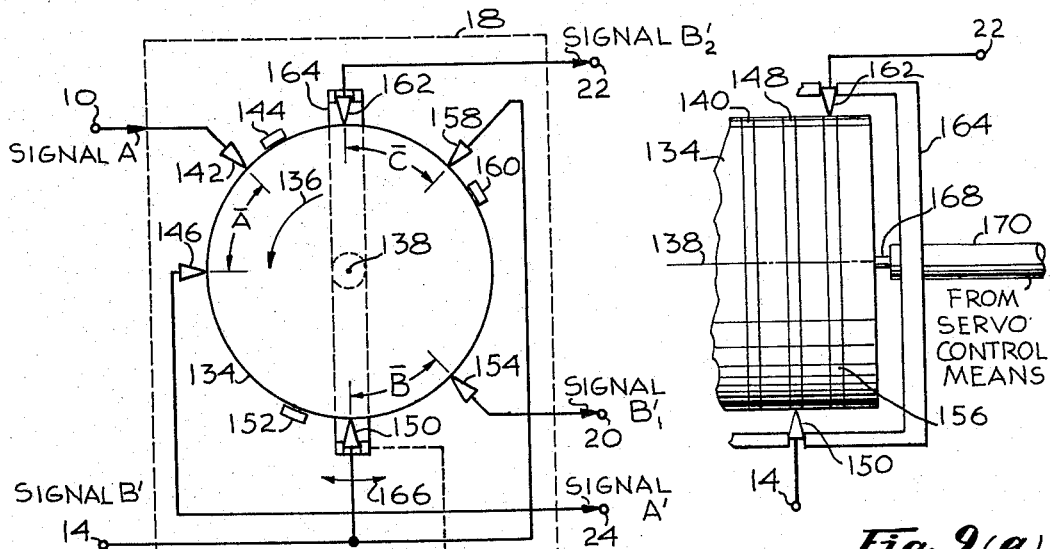
Fig. 9
Fig. 9(a)
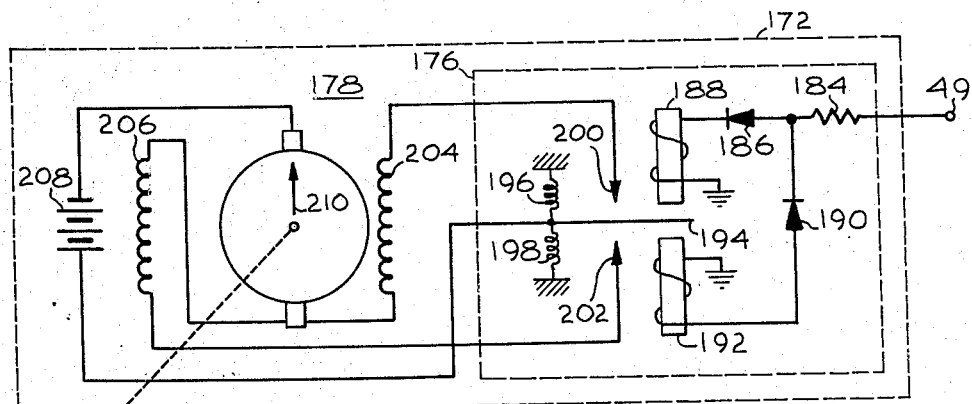
Fig. 11
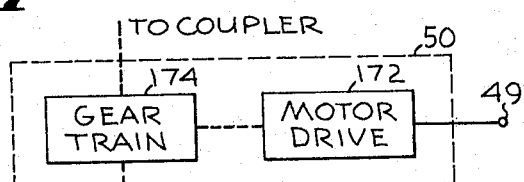
Fig. 10
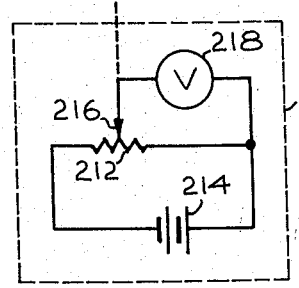
Fig. 12
MELVIN L. BAKER
INVENTOR.
BY
ATTORNEY

United States Patent Office

3,290,590
Patented Dec. 6, 1966

3,290,590
ELECTRICAL SIGNAL ANALYZING SYSTEMS
Melvin L. Baker, Woodland Hills, Calif., assignor to
TRW Inc., a corporation of Ohio
Filed June 29, 1960, Ser. No. 39,674
15 Claims. (Cl. 324—68)

This invention relates to signal analyzing systems and, more particularly, to improved electrical measuring systems and methods.

In signal analyzing systems, it is often desired to measure the magnitude of timing displacement between particular signals which correspond substantially to the same amplitude-versus-time function, i.e., between mutually coherent signals. For example, it is particularly desirable to accurately measure the magnitude of such a timing displacement in passive position location systems. Briefly, in such systems, to determine the position of a target, such as a moving aircraft, a signal emanating from a target is received by each of a plurality of fixedly positioned receivers. Under practical field conditions, the signal emanating from the target will generally constitute but one component of a more complex signal received by each receiver which contains other signal components and/or random noise. Since the signal components received by the receivers from the target emanate from a single source, they correspond to the same amplitude-versus-time function and are, therefore, mutually coherent. Further, since the receivers are fixedly positioned, the relative time of arrival of the mutually coherent signal components at the receivers will depend upon the instantaneous position of the target relative to the receivers. Therefore, knowing the relative position of the receivers, a measurement of the timing displacement between the mutually coherent signal components will be determinative of the position of the target.

Systems for measuring such unknown magnitudes of timing displacement between mutually coherent components have taken many different forms. In accordance with one of the prior art measuring systems, to measure an unknown magnitude of timing displacement between two mutually coherent signal components, one component being a part of a first electrical signal while the other component is a part of a second electrical signal, the signals are first applied to a multiplier network where they are electrically multiplied to develop a product signal. The product signal is then applied to an integrator network where it is time-averaged to produce an output signal. This operation of multiplication and time-averaging is commonly termed "signal correlation," and the apparatus for performing the operation, a signal correlator.

As is commonly known, when the two signals are multiplied and time-averaged (correlated), the magnitude of the resulting output signal will depend upon the magnitude of the timing displacement between the two coherent components. That is, in general, when the coherent components of the two signals are in timing agreement, the magnitude of the output signal will be a maximum, while this output signal will fall to a minimum whenever the mutually coherent components reaching the multiplier are displaced in timing to an extent that they are not even partly co-extensive in the time domain. Thus, in this prior art system, to determine the unknown magnitude of timing displacement between a component of a first electrical signal and a mutually coherent component of a second signal, means are provided for selectively time delaying one of the signals prior to multiplication. As the magnitude of delay is increased, the magnitude of timing displacement between the coherent components, reaching the multiplier, will decrease. Likewise, the magnitude of the output signal will increase. When a magnitude of time delay equal to the unknown magnitude of timing displacement is introduced into one of the signals, the magnitude of timing displacement between the coherent components, as applied to the multiplier, will be zero, and the resulting magnitude of output signal will be a maximum. Therefore, by measuring the magnitude of introduced time delay for which the output signal is maximized, the unknown magnitude of initial timing displacement between the coherent components is determined.

As briefly described, however, this prior art system will in itself permit unambiguous measurement of the magnitude of timing displacement between mutually coherent components of two electrical signals only when each signal contains but one component which is mutually coherent with a component of the other signal. This is attributable to the fact that a signal correlator develops an output signal whenever any component of one signal is in substantial timing agreement with a mutually coherent component of the other signal, as they reach the multiplier of the correlator. Thus, when more than one component of the first signal is mutually coherent with a component of the second signal, the resulting output signal may be due to a correlation of a plurality of mutually coherent components. Then, if the mutually coherent signal components of the first and second signals are displaced by different magnitudes of time, a maximum in the magnitude of the resulting output signal will be meaningless as an indication that a magnitude of time delay equal to the unknown magnitude of timing displacement is being introduced into a one of the signals.

The limited usefulness of the prior art system may be more clearly understood by way of example. Thus, let it first be assumed that it is desired to measure the magnitude of timing displacement between a signal component $A_1$ of a first electrical signal and a signal component $A_2$ of a second electrical signal—component $A_1$ being coherent with component $A_2$ to define a pair of components which are mutually coherent. Since it is desired to measure the magnitude of timing displacement between only components $A_1$ and $A_2$, they will, for ease in future description, be termed "desired" signal components while all other components in these signals will be termed "undesired." Still further, let it be assumed that there is no undesired component of either signal which is mutually coherent with any component of the other signal. Then by imposing a suitable magnitude of delay upon one of the signals relative to the other signal, the components $A_1$ and $A_2$ may be brought into timing agreement. A signal correlator operating upon the signals thus processed will, as described above, then yield an output signal of maximum magnitude for these particular electrical signals. The actual magnitude of delay which is imposed to produce this maximum will then be equal to the magnitude of the initial timing displacement between components $A_1$ and $A_2$. An unambiguous and accurate measurement of timing displacement between components $A_1$ and $A_2$ will then have been made since there is no other component in the first signal which, when multiplied and time-averaged with a component of the second signal, can contribute to the development of an output signal from the correlator.

However, let it now be assumed that during the above-described process of measuring the timing displacement between the desired signal components $A_1$ and $A_2$ an undesired signal component $B_1$ was also present in the first electrical signal and that this undesired signal component $B_1$ was coherent with another undesired signal component $B_2$ of the second electrical signal. Let it be further assumed that the magnitude of timing displacement between components $B_1$ and $B_2$ was of the same order of magnitude as, but not equal to, the magnitude of timing displacement between desired signal components $A_1$ and $A_2$. In practice, such a condition may arise whenever a signal source in the vicinity of the measuring system emanates energy which is of substantially the same frequency as the desired signal components. For example, in a passive position location system wherein the position of an object is being determined by measuring the timing displacement between mutually coherent signal components of first and second signals received at different receiver locations, the undesired coherent signal components might be signal energy transmitted from a nearby fixedly positioned radio station. Now then, in the attempt to measure the magnitude of timing displacement between components $A_1$ and $A_2$, trial values of known magnitudes of relative delay are introduced between the two signals. As the desired signal components $A_1$ and $A_2$ begin to come into timing agreement at the multiplier, undesired signal components $B_1$ and $B_2$ will also start to come into timing agreement. The output signal from the correlator will then be made up of two portions, one portion attributable to the correlation of one pair of mutually coherent desired signal components $A_1$, $A_2$, and the other portion due to the correlation of the pair of undesired signal components $B_1$, $B_2$. Knowing the magnitude of relative delay introduced between the two signals which now produces a maximum in the correlation output signal will thus be of no value as an indicia of timing displacement between the members of either pair of mutually coherent components $A_1$, $A_2$ or $B_1$, $B_2$. The magnitude of time delay required to produce a maximum in the correlation output signal will, under these conditions, be a function of the relative energy content of the two pairs of components, as well as the actual magnitudes of timing displacement between the members of each pair and the difference in these magnitudes.

Thus, in accordance with the prior art, in cases where it is desired to employ the above-described signal correlation technique to measure the magnitude of timing displacement between the members of a first desired pair of mutually coherent signal components, each member of the pair comprising a component of one of two different signals, ambiguities and inaccuracies may arise if these two signals taken together contain a second pair of mutually coherent undesired signal components where each member of this second pair also exists as a component of a different one of these same two signals. The problem becomes particularly acute when the magnitude of the timing displacement between the members of the first pair of mutually coherent components is of the same order of magnitude as the magnitude of timing displacement between the members of the second pair. This assumes, however, that is is impractical to discriminate between the two pairs of components on a frequency selective, amplitude selective or time selective basis. Further, this same difficulty may arise in the special situation where the two signals taken together contain a first pair of mutually coherent desired signal components which are of interest, and there is present in either one of the signals an undesired interference component which is coherent with one of the member components of the first pair in the other signal.

In view of the above, it is an object of the present invention to provide a system for accurately measuring the magnitude of timing displacement between mutually coherent desired signal components in the presence of mutually coherent undesired signal components.

It is another object of this invention to substantially remove any ambiguity in measuring the magnitude of timing displacement between mutually coherent desired signal components caused by a correlation of mutually coherent undesired signal components.

In accordance with the above objects, the present invention makes use of the discovery that after first bringing the undesired signal components into timing agreement, as by time-delaying one of the signals, separate correlations of equally time advanced and time retarded versions of one of the resulting signals with the other signal will develop separate correlation output signals which, when subtracted, will result in a remainder signal, the magnitude of which is substantially free of any undesired signal components. Thus, in accordance with the present invention, the magnitude of the remainder signal will substantially represent a correlation of only desired signal components. Then, by selectively varying the magnitude of time by which the signal versions are equally and respectively advanced and retarded, the desired signal component of one of the versions may be brought into timing agreement with the desired component of the other signal. The magnitude of the remainder signal will then increase to a maximum for this particular condition. The absolute value of the equal magnitudes of advancement and retardation necessary to bring this maximum about is then measured. By combining the measured absolute value with the magnitude of time delay initially introduced to bring the undesired signal components into timing agreement—the sought-after magnitude of timing displacement between the desired mutually coherent components is arrived at.

As will be later described in greater detail, the manner in which the above-measured absolute value and the time delay magnitude are combined is determined by known environmental conditions surrounding the measurement. Thus, if due to environmental conditions the magnitude of time delay necessary to bring the undesired signal components into timing agreement is known to be less than the unknown magnitude of timing displacement which is sought, the measured absolute value will be added to the initial magnitude of time delay. Similarly, if this magnitude of delay is known to be greater than the sought-after unknown magnitude of timing displacement, the measured absolute value will be subtracted from the magnitude of delay.

As will become apparent hereinafter in a preferred embodiment of the present invention, the magnitude of time by which the signal versions are respectively advanced and retarded is manually controllable. However, as will be later described in detail, the apparatus and method of the present invention for developing the remainder signal may be utilized in different forms to develop a control signal. The control signal may be utilized to servo control the controllable magnitude of time by which the signal versions are respectively advanced and retarded such that a measure thereof will continuously represent the unknown magnitude of timing displacement. Such forms of the present invention are particularly useful in passive position location systems where the position of a moving target is determined by measuring selective changes in the magnitude of timing displacement between coherent desired signal components of time-varying electrical signals.

The above, as well as other forms of the present invention, may be more completely understood by reference to the following detailed description, when considered with the drawings, in which.

Figure 1:
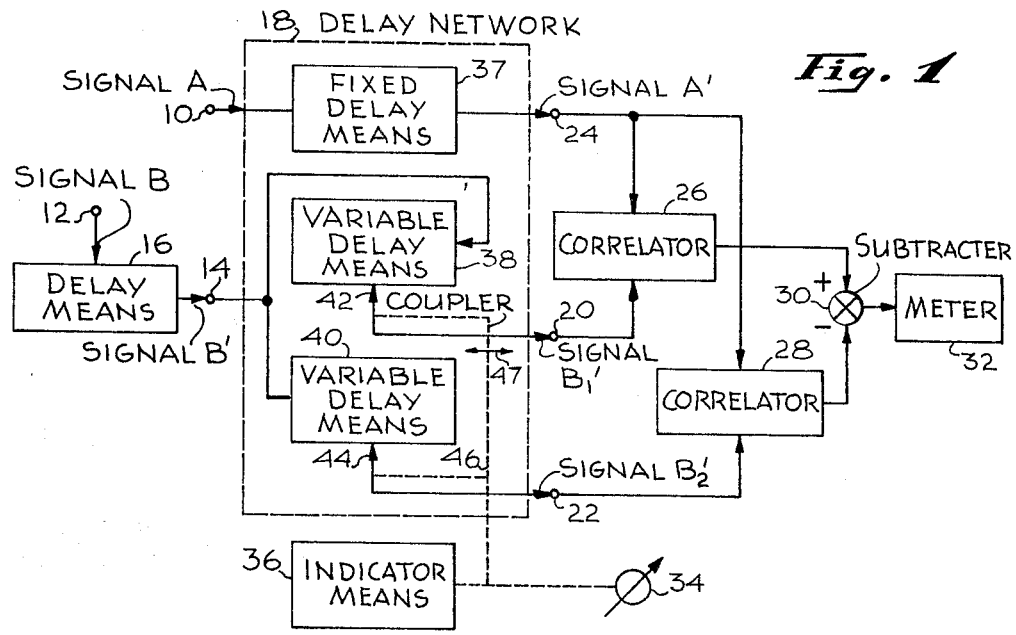
FIGURE 1 is a block diagram representation of the basic form of signal measuring system in accordance with the present invention.
Figure 2:
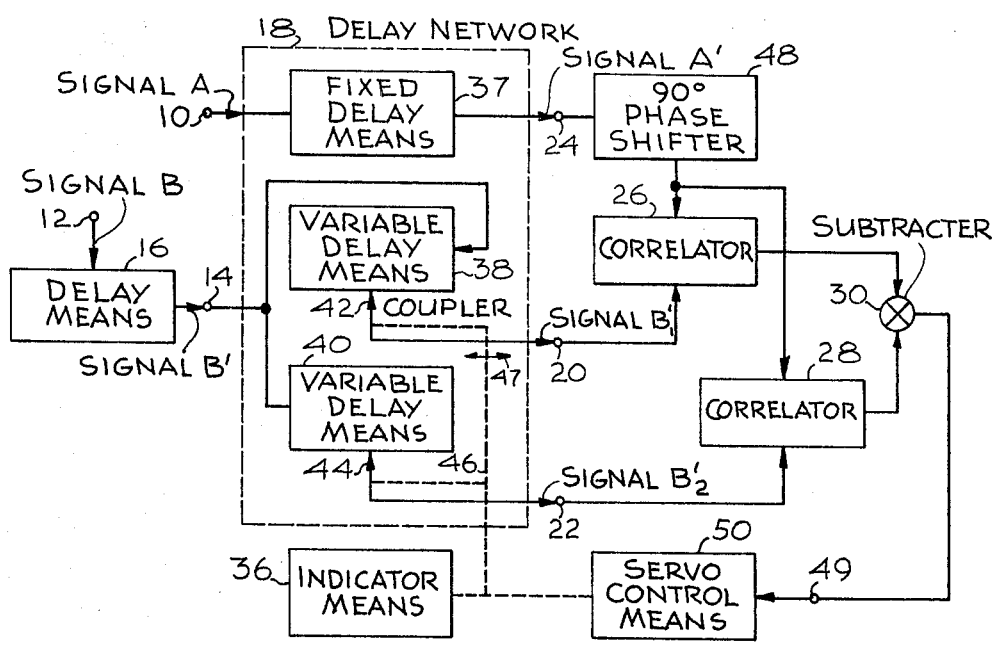
FIGURE 2 is a block diagram representation of a form of measuring system for providing automatic signal measurement in accordance with the present invention.

FIGURES 3(a) through (f) represent, in graphical form, the undesired and desired coherent signal components of the signals received by the measuring system of the present invention as advanced and retarded in time by the apparatus illustrated in FIGURES 1 and 2;

FIGURE 4 is a block diagram representation of another form of measuring system for providing automatic measurement of unknown magnitudes of timing displacement between mutually coherent signal components;

FIGURES 5(a) through (j) represent, in graphical form, the undesired and desired signal components of the signals received by the measuring system of the present invention as advanced and retarded in time by the apparatus illustrated in FIGURE 4;

FIGURE 6 is a block diagram representation of still another form of measuring system for providing automatic measurement of an unknown magnitude of timing displacement between mutually coherent signal component;

FIGURES 7(a) through (h) represent, in graphical form, the undesired and desired signal components of the signals received by the measuring system of the present invention as advanced and retarded with time by the apparatus illustrated in FIGURE 6;

FIGURE 8 is a representation of one form of delay modulation device suitable for use in connection with the embodiment shown in FIGURE 6;

FIGURE 9 is a diagrammatic representation of a preferred form of delay network utilizing a magnetic drum for use in the present invention;

FIGURE 9(a) is a diagrammatic representation of a partial side view of the magnetic drum assembly of the preferred form of delay network;

FIGURE 10 is a block diagram representation of one form of servo control means suitable for use in the present invention;

FIGURE 11 is a representation of one form of motor drive suitable for use in connection with the embodiment illustrated in block form in FIGURE 10; and FIGURE 12 is a representation of one form of indicator means suitable for use in the present invention.

Referring to FIGURE 1, there is represented a measuring system illustrating the basic form of the present invention. As previously mentioned in accordance with the present invention, to measure an initial unknown magitude of timing displacement between mutually coherent signal components of first and second signals in the presence of mutually coherent undesired signal components, the undesired signal components are first brought into timing agreement, as by delaying one of the signals. Then, a correlation of time advanced and time retarded signal versions of one of the signals with the other signal will develop output signals which, when subtracted, will result in a remainder signal the magnitude of which represents a correlation of only the coherent desired signal components. Then, by selectively varying the magnitude of time by which the signal versions are equally and respectively advanced and retarded, the desired signal components of one of the signal versions and the other signal will be brought into timing agreement. As the magnitude of time advancement and retardation is selectively changed, the magnitude of the remainder signal will change to represent the occurrence of the timing agreement. Therefore, by measuring the absolute value of the time advancement and retardation which brings the desired signal components into timing agreement and knowing the magnitude of time delay required to initially bring the undesired signal components into timing agreement, the initial unknown magnitude of timing displacement between the mutually coherent desired signal components may be determined.

More particularly, as represented in FIGURE 1, the basic form of the present invention is illustrated as including input terminals 10 and 12 to which the first and second signals are respectively applied. Further, coupled between terminal 12 and a terminal 14 is a delay means 16 for delaying the second signal such that the mutually coherent undesired signal components of the first and second signals as applied to terminals 10 and 14 will be in timing agreement. Still further, as illustrated in FIGURE 1, terminals 10 and 14 are coupled to a delay network represented by the broken line rectangle 18. As will later be described in greater detail, the first and second signals are processed by delay network 18 such that signal versions of the second signal are developed at terminals 20 and 22 which are respectively time retarded and time advanced relative to the first signal as it appears at terminal 24. Then, in accordance with the basis of the present invention, to develop the aforementioned output signals, signal correlators 26 and 28 are included. As shown, signal correlator 26 is coupled between terminals 24 and 20, and signal correlator 28 is coupled between terminals 22 and 24. As represented in FIGURE 1, output signals developed by signal correlators 26 and 28 are coupled to a subtractor 30. Further, the output of subtractor 30 is connected to a meter 32. Thus, the magnitude of the remainder signal developed by subtracter 30 may be observed at meter 32. Still further, in accordance with the present invention as illustrated in FIGURE 1, the magnitude of time by which the signal versions appearing at terminals 20 and 22 are equally advanced and retarded may be controlled by adjusting a control means represented by control knob 34, the absolute value of time advancement and retardation being indicated at an indicator means 36.

Specifically, the operation of the basic form of the present invention may be more completely understood by a combined reference to both FIGURE 1 and FIGURES 3(a) through 3(f). FIGURES 3(a) through 3(f) illustrate various stages or steps in the processing of a first signal, signal A, and a second signal, signal B, prior to correlation by the apparatus illustrated in FIGURE 1. In FIGURES 3(a) through 3(f), signals A and B are each illustrated as containing undesired (U) and desired (D) signal components. These components, and their mutual timing relationship, are diagramatically indicated by the rectangles bearing the letters U and D, respectively. It is to be understood, however, that such a diagrammatic representation is merely for convenience in describing the logic behind the present invention. Such components may take a variety of different forms, and may each be comprised of a plurality of monofrequency components. Thus, in FIGURE 1, a first signal, signal A, which includes a desired and an undesired signal component, is applied to input terminal 10 of the delay network 18. A second signal, signal B, which includes desired and undesired signal components which are mutually coherent with the desired and undesired signal components of signal A, is similarly applied to input terminal 12. As represented by FIGURES 3(a) and 3(b), the mutually coherent desired signal components of signal A and signal B are initially displaced by an unknown magnitude of timing displacement $\tau_1$ which it is desired to measure, while the mutually coherent undesired signal components are displaced by a known fixed magnitude of timing displacement $\tau_2$.

In practice, to determine the fixed magnitude of timing displacement between the coherent undesired signal components, one of two methods may be employed, depending upon the source of the undesired signal components. If the coherent undesired signal components are due to locally generated noise (such as may appear in a common power supply system), the fixed magnitude of timing displacement may be determined by blocking reception of externally received signals and then, as in the prior art systems, determining the magnitude of timing displacement. If the coherent undesired signal components are due to a signal source which is fixedly positioned relative to the measuring system, as in the case of a radio station in proximity to a passive position location system, the fixed magnitude of timing displacement may be determined by using the prior art apparatus when no desired signal components are being received.

Having determined the fixed magnitude of timing displacement between the undesired signal components, a magnitude of delay equal thereto is imposed upon one of the signals so as to bring the undesired signal components into timing agreement. As shown in FIGURE 1, such a magnitude of time delay is inserted by delay means 16 into signal B to develop a signal B'. Thus, the undesired signal components in signal A and signal B', as applied to terminals 10 and 14 are in timing agreement. As delayed by delay means 16, signal B' is illustrated in FIGURE 3(c).

Generally, the unknown magnitude of timing displacement between the desired components of the two signals will not be equal to the known fixed magnitude of timing displacement between the undesired components. Thus, although the mutually coherent undesired signal components are in timing agreement, an unknown magnitude of timing displacement will remain between the desired signal components applied respectively to terminals 10 and 14 of delay network 18. Such a remaining unknown magnitude of timing relay is represented at $\tau_3$ in FIGURES 3(a) and (c). As previously mentioned, to determine the value of this remaining unknown magnitude of timing displacement, one of the signals is correlated with both time advanced and time retarded versions of the other signal. To develop the time advanced and time retarded signal versions, signals A and B are applied to delay network 18. As illustrated in FIGURE 1, in one form of delay device 18, signal A is delayed by a fixed magnitude of time (x) by a fixed delay means 37 to develop a signal A'. Signal A' appears at output terminal 24. The components of signal A' are represented in FIGURE 3(d). Signal B, on the other hand, is applied to both a variable delay means 38 and a variable delay means 40 to develop first and second signal versions of signal B at terminals 20 and 22, respectively. As delayed by variable delay means 38 and 40, these signal versions, signal $B_1'$ and signal $B_2'$ are respectively represented in FIGURES 3(e) and (f). As represented in FIGURE 1, the magnitude of delay presented by variable delay means 38 and 40 is controlled by adjusting control means 34 which is, in turn, coupled to both variable delay means by a coupler indicated by dotted line 46. In the arrangement shown, it is contemplated that a given adjustment of the control means 34 will act to simultaneously increase the magnitude of delay inserted by one of the variable delay means while decreasing the magnitude of delay inserted by the other variable delay means. Furthermore, the absolute value of such increase and such decrease will be the same. Thus, by constructing the variable delay means to have a mean magnitude of delay substantially equal to the fixed magnitude of delay inserted by fixed delay means 37, a given adjustment of the control means will introduce into a one of the signal versions a magnitude of delay greater than the fixed magnitude of delay while introducing into the other signal version a magnitude of delay which is less than the fixed magnitude of delay. Therefore, in effect, the delay network has developed first and second signal versions of a one of the signals which are respectively advanced and retarded in time relative to the other signal. By selectively adjusting control means 34, the signal versions may be respectively advanced and retarded so as to bring the desired signal component of one of the signal versions into timing agreement with the desired component of the other signal. Such a condition is represented by FIGURES 3(d), (e) and (f). As illustrated by FIGURES 3(d), (e) and (f) signals $B_1'$ and $B_2'$ have been selectively retarded and advanced relative to signal A' so as to bring the desired signal components of signals A' and $B_1'$ into timing agreement. As is further noted from FIGURES 3(d), 3(e) and 3(f), as signals $B_1'$ and $B_2'$ are thus selectively retarded and advanced, the timing displacement between the desired signal component of the other signal version relative to the desired component of the other signal is increased. Thus, as illustrated, when the desired signal components of signals A' and $B_1'$ are in timing agreement, the desired signal components of signals A' and $B_2'$ are out of timing agreement. Still further, as noted in FIGURES 3(d), 3(e) and 3(f), as signals $B_1'$ and $B_2'$ are selectively advanced and retarded, the undesired signal components thereof maintain like timing relationships with the undesired signal component of signal A'. In view of the above, a correlation of signal A' with signal $B_1'$ by correlator 26 of FIGURE 1 will result in a first output signal, the magnitude of which initially will be due primarily to a correlation of the undesired signal components and due only secondarily to a correlation of the desired signal components. However, as desired signal components of signals A' and $B_1'$ are brought into timing agreement, the magnitude of that portion of the output signal which is due to a correlation of the mutually coherent desired signal components will increase to a maximum, whereas that portion of the output signal which is due to a correlation of the mutually coherent undesired signal components will decrease. In a like manner, a correlation of signal A' with signal $B_2'$ by correlator 28 of FIGURE 1 will result in a second output signal, the magnitude of which will initially equal the initial magnitude of the first output signal. However, as previously mentioned, as the desired signal components of signal A' and signal $B_1'$ are brought into timing agreement, the timing displacement between the desired signal components of signals A' and $B_2'$ is increased. Therefore, the magnitude of the portion of the second output signal which is due to a correlation of the desired signal components will decrease to a minimum, while the portion of the second output signal which is due to a correlation of the mutually coherent desired signal components decreases in magnitude substantially as the corresponding portion of the first output signal. Thus, since the portions due to a correlation of mutually coherent undesired signal components in the output signals are always of substantially equal magnitude, the remainder signal developed by a subtraction of the output signals by subtracter 30 of FIGURE 1 will substantially represent only that portion of the output signals which is due to a correlation of the mutually coherent desired signal components. Therefore, by selectively adjusting control means 34 of FIGURE 1, and by observing the maximum magnitude of the remainder signal at meter 32, the absolute value of time delay noted at indicator means 36 will be an accurate measure of the remaining unknown magnitude of timing displacement $\tau_3$ between the mutually coherent desired signal components. Then, as previously mentioned, a combination of this measured value and the known fixed magnitude of timing displacement between the mutually coherent undesired signal components will yield the sought-after initial unknown magnitude of timing displacement $\tau_1$.

As previously mentioned, the manner in which the measure of absolute values and the known magnitude of timing displacement are combined is determined by the known surrounding environmental conditions. Thus, for example, when an unknown magnitude of timing displacement is to be measured in a passive position location system, the magnitude of timing displacement between the undesired signal components may be known to be substantially equal to zero. Under such conditions, the unknown magnitude of timing displacement will never be less than the known fixed magnitude of timing displacement, and therefore, the measured absolute value may be added to the known magnitude of timing displacement to determine the initial unknown magnitude of timing displacement. Similarly, for example, when due to the position of the object emanating the undesired signal components, the known magnitude of timing displacement is substantially equal to the distance between the receivers of the location system, the unknown magnitude of timing displacement will never be greater than the known magnitude of timing displacement. Under such conditions, the measured absolute value may be subtracted from the known magnitude of timing displacement to determine the initial unknown magnitude of timing displacement. Therefore, by knowing the fixed magnitude of timing displacement between the mutually coherent undesired signal components and further knowing the expected range of values within which the unknown magnitude of timing displacement will lie, the manner in which the measured absolute value and the known magnitude of timing displacement will be combined may be determined and the system adjusted, as by calibrating indicator means 36, to directly measure the initial unknown magnitude of timing displacement.

As described in connection with FIGURE 1, the basic form of the present invention is particularly adapted to measuring systems wherein the unknown magnitude of timing displacement is determined by manually controlling the magnitude of delay imposed upon one of the signals being processed. However, it may be desired to utilize a measuring system wherein the unknown magnitude of timing displacement is automatically determined. For example, automatic measurement of timing displacement may be particularly desirable in a passive position location system wherein the position of a rapidly moving aircraft is to be determined. One form of such a measuring system which utilizes the basic concept of the present invention is illustrated in FIGURE 2.

As illustrated, the measuring system depicted in FIGURE 2 varies from that illustrated in FIGURE 1 only by: (1) the placement of a 90° phase shifter 48 between terminal 24 and correlators 26 and 28, and (2) by providing a servo control means 50 between the output of subtracter 30 and the coupler 46. As will be described in detail in connection with FIGURE 11, servo control means 50 will respond automatically to the magnitude and polarity of the remainder signal to provide a servo control of the magnitude of the time by which signals $B_1'$ and $B_2'$ are retarded and advanced relative to signal A' by delay network 18.

With the exception of the above elements, in operation, the measuring system of FIGURE 2 will function substantially as described in FIGURE 1. Therefore, in the apparatus of FIGURE 2, signal A and signal B will be processed as described in connection with FIGURE 1 by delay means 16 and delay network 18 and will develop a remainder signal the magnitude of which is due to only a correlation of mutually coherent desired signal components. Thus, signal A' is developed at terminal 24, signal $B_1'$ at terminal 20 and signal $B_2'$ at terminal 22.

As illustrated in FIGURE 2, signal A' is applied to the 90° phase shifter 48 which is of the type which will shift the phase of substantially all monofrequency signal components of signal A' by 90°. As is well known in the art, shifting the phase of all coherent monofrequency signal components of one of the two signals being multiplied and time averaged by a correlator will cause an output signal to be produced which will be a minimum when the mutually coherent signal components of the signals being correlated are in timing agreement. Further, the magnitude and polarity of the output signal thus developed will vary with the timing agreement between the mutually coherent signal components. Thus, if a one of the coherent signal components leads the other, the output signal will be of one polarity, while being of an opposite polarity if that one of the signal components lags the other. Such operation is described in detail in the U.S. patent to Guanella, 2,253,975, issued August 26, 1941. Thus, in the measuring system illustrated in FIGURE 2, upon subtracting the output signals produced at correlators 26 and 28, a remainder signal will be developed which, instead of being of a maximum magnitude, as described in connection with FIGURE 1, will be of zero magnitude when the desired signal components of a one of the signal versions and the other signal are in timing agreement. Further, the remainder signal will vary both in magnitude and polarity to accurately represent any magnitude of timing displacement between the coherent desired signal components as applied to correlator 26. Thus, for example, if the desired signal component of signal $B_1'$ is delayed by a magnitude of time such that it is leading the desired signal component of signal A', the remainder signal will be of a negative polarity and in magnitude will represent the magnitude of time advancement between the desired signal components. Likewise, if the desired signal component of signal $B_1'$ lags the desired signal component of signal A', the remainder signal will be of a positive polarity and the magnitude thereof will represent the magnitude of time by which the desired signal component of signal $B_1'$ lags the desired signal component of signal A'.

As is further illustrated in FIGURE 2, the remainder signal developed, as described above, is applied to a terminal 49 of servo control means 50. As will be described in detail in connection with FIGURE 11, the remainder signal will be transduced into mechanical energy which will cause the variable delay means 38 and 40 to change the magnitude of delay imposed upon the signals. Thus, by applying the remainder signal to the servo control means 50, the magnitude of time by which the signal versions are respectively advanced and retarded relative to signal A' is automatically controlled such that the desired signal components from one of the signal versions and signal A' are continuously in timing agreement. Therefore, by noting the controllable magnitude of time by which the signal versions are advanced and retarded, as indicated at indicator means 36, the remaining unknown magnitude of timing displacement is determined. Then, as previously described in connection with FIGURE 1, the measured magnitude of the remaining unknown magnitude of timing displacement may be combined with the known fixed magnitude of timing displacement between the undesired signal components to determine the initial unknown magnitude of timing displacement between the desired signal components.

Referring now to FIGURE 4, there is illustrated another form of measuring system which, in accordance with the present invention, will provide automatic and accurate measurement of the unknown magnitude of timing displacement between mutually coherent desired signal components. As represented in FIGURE 4, the measuring system corresponds to that illustrated in FIGURE 1 as to delay means 16 and delay network 18. Thus, signal A' is developed at terminal 24, signal $B_1'$ at terminal 20 and signal $B_2'$ developed at terminal 22. In accordance with this form of the present invention, to develop a signal which, when applied to terminal 49 of servo control means 50, will automatically control the magnitude of time by which the signal versions are respectively advanced and retarded, signal A' is separately correlated with signal versions of signal $B_1'$ which are advanced and retarded by a fixed magnitude of time relative to signal A' to produce first and second output signals. Also, signal A' is separately correlated with signal versions of signal $B_2'$ which are advanced and retarded by a fixed magnitude of time relative to signal A' to develop third and fourth output signals. The first and second output signals are then subtracted to develop a first remainder signal while the third and fourth output signals are subtracted to develop a second remainder signal. The remainder signals are then subtracted to develop the desired control signal. The magnitude and polarity of the remainder signal may then be utilized by the servo control means 50 to automatically control the magnitude of time by which the signals $B_1'$ and $B_2'$ are respectively retarded and advanced as to continuously produce a timing agreement between the desired signal components of one of the signal versions and signal A'.

Specifically, to produce the signal versions of signal $B_1'$ which are advanced and retarded relative to signal A', signal A' is first delayed by a fixed magnitude of delay $x_1$ by a delay means 52 to develop a first delay signal A''. Since signal A'' is a delayed version of signal A', a correlation of signal A'' with signal $B_1'$ will, in effect, represent a correlation of a signal version of signal $B_1'$ which is advanced relative to signal A'. In FIGURE 4, this operation is performed at correlator 54 to develop a first output signal.

To develop a signal version of signal $B_1'$ which is retarded relative to signal $A'$, signal $B_1'$ is delayed by a fixed magnitude of time $x_1$ by a fixed delay means 56 to develop a second delay signal, signal $B_1''$. Signal $B_1''$, being a retarded signal version of signal $B_1'$, is then correlated with signal $A'$ at a correlator 58 to develop the second output signal.

Further, to produce the third output signal which will correspond to a correlation of a signal version of signal $B_2'$ which is advanced relative to $A'$, signal $A''$ is correlated with signal $B_2'$ by a correlator 60.

Still further, to develop the fourth output signal which corresponds to a correlation of a signal version of signal $B_2'$ which is retarded relative to signal $A'$, signal $B_2'$ is first delayed by a fixed magnitude of time $x_1$ by a fixed delay means 62 to develop a third delay signal, signal $B_2''$. Signal $B_2''$ is then correlated with signal $A'$ by a correlator 64 to develop the fourth output signal.

As shown in FIGURE 4, the above-mentioned output signals are applied to a subtracter 66. In accordance with this form of the present invention, the first and second output signals are subtracted by subtracter 66 to develop a first remainder signal. Likewise, the third and fourth output signals are subtracted to develop a second remainder signal. These remainder signals are then subtracted by subtracter 66 to develop a control signal which is applied to the servo control means 50. As will be described in detail in connection with FIGURE 11, the control signal is transduced by servo control means 50 into mechanical energy which will automatically control the delay network 18, such that the signals $B_1'$ and $B_2'$ are respectively retarded and advanced by a controllable absolute value of time to continuously bring the desired signal components of one of the signal versions and signal $A'$ into timing agreement. Therefore, as described in connection with FIGURE 2, a measurement of this absolute value of time will continuously determine the remaining unknown magnitude of timing displacement between the mutually coherent desired signal components. Further, by combining this measured magnitude with the known fixed magnitude of timing displacement between the undesired signal components, the initial unknown magnitude of timing displacement may be accurately determined.

The operation of the form of the invention illustrated in FIGURE 4 may be more clearly understood by reference to FIGURES 5(a) through 5(f) which illustrate, in graphical form, the manner in which signals A and B are processed to develop the desired control signal. In particular, FIGURE 5(a) represents signal $A'$ as applied to terminal 24 and FIGURES 5(b) and 5(c) represent signals $B_1'$ and $B_2'$ as applied to terminals 20 and 22 when the desired signal components of signals $B_1'$ and $A'$ are in timing agreement.

As previously described, to develop the desired control signal, signal versions of signal $B_1'$ and signal $B_2'$ which are respectively advanced and retarded relative to signal $A'$ are separately correlated with signal $A'$ to develop output signals which, when combined, will produce the desired control signal. Further, to develop these advanced and retarded signal versions of signals $B_1'$ and $B_2'$, signal $A'$, as well as signals $B_1'$ and $B_2'$ are separately delayed by a fixed magnitude of time $x_1$. As delayed, signal $A''$ is represented in FIGURE 5(d), signal $B_1''$ in FIGURE 5(e) and signal $B_2''$ in FIGURE 5(f).

As described above, to develop the first output signal, signal $B_1'$ is correlated with signal $A_1''$ at correlator 54. As illustrated in FIGURES 5(b) and 5(d), when the desired signal components of signals $A'$ and $B_1'$ are in timing agreement, the undesired and desired signal components of signals $A''$ and $B_1'$ are in such a partial timing agreement that the first output signal will have a magnitude which is due primarily to a signal correlation of the mutually coherent desired signal components and secondarily to a correlation of the mutually coherent undesired signal components.

As mentioned above, to develop the second output signal, signal $A'$ is correlated with signal $B_1''$. As illustrated in FIGURES 5(a) and 5(e), when the desired signal components of signals $A'$ and $B_1'$ are in timing agreement, the undesired and desired signal components of signals $A'$ and $B_1''$ are in such a partial timing agreement that the magnitude of the second output signal will be entirely due to a correlation of the desired signal components. Further, the magnitudes of the first and second output signal will be such that a subtraction of the first and second output signals will develop a first remainder signal the magnitude of which will correspond entirely to a correlation of the undesired signal components present in signals $B_1'$ and $A''$.

As previously described in detail above, to develop the third output signal, signal $B_2'$ is correlated with signal $A''$ by correlator 60. As illustrated in FIGURES 5(c) and (d), the undesired and desired signal components of signals $B_2'$ and $A''$ are in such a partial timing agreement that the third output signal will be of substantially zero magnitude. This is due to a lack of timing agreement between either the mutually desired or undesired signal components contained in signal $B_2'$ and $A''$.

To develop the fourth output signal, signal $B_2''$ is correlated with signal $A'$ by correlator 64 of FIGURE 4. As illustrated in FIGURES 5(a) and 5(f), when the desired signal components of signals $B_1'$ and $A'$ are in timing agreement, the undesired and desired signal components of signals $A'$ and $B_2''$ are in such a partial timing agreement that the magnitude of the fourth output signal will be due entirely to a correlation of the undesired signal components. Further, due to the like partial timing agreement between the mutually coherent undesired signal components of signals $A'$ and $B_2''$ and the mutually coherent undesired signal components of signals $A''$ and $B_1'$ the magnitude of the fourth output signal will be equal in magnitude to the magnitude of the first remainder signal. Therefore, since the third output signal is substantially equal to zero, a subtraction of the third and fourth output signals will result in a second remainder signal which is substantially equal to the first remainder signal. Thus, a subtraction of the first and second remainder signals will result in a control signal of substantially zero magnitude. Therefore, when the desired signal components of signal $B_1'$ and signal $A'$ are in timing agreement, the apparatus of FIGURE 4 will result in a control signal of substantially zero magnitude thereby indicating that the controllable magnitude of time by which signal $B_1'$ is retarded is substantially equal to the remaining unknown magnitude of timing displacement between the mutually coherent desired signal components.

It is to be further noted, however, that when the desired signal components of signal $B_1'$ and signal $A'$ are out of timing agreement, the control signal developed by the apparatus illustrated in FIGURE 4 will be of a magnitude and polarity which will represent the magnitude of timing displacement between the mutually coherent desired signal components of signal $A'$ and signal $B_1'$. For example, consider the situation as represented by FIGURES 5(g), (h), (i) and (j), which illustrate a condition wherein signals $B_1'$ and $B_2'$ have not been retarded and advanced by a sufficient magnitude of time as to bring the desired signal components of signals A and $B_1'$ into timing agreement. Under such conditions, the timing of the undesired and desired signal components of signals $A''$ and $B_1'$, as represented by FIGURES 5(d) and (g), will be such that the magnitude of the first output signal will be due primarily to a correlation of the mutually coherent undesired signal components and secondarily due to a correlation of the mutually coherent desired signal components. Similarly, as noted from FIGURES 5(a) and (i), the timing of signals $A'$ and $B_1''$ will be such that the second output signal will be due primarily to a correlation of the mutually coherent desired signal components and secondarily to a correlation of the mutually coherent undesired signal components. Further, the magnitude of the first and third output signals will be such that the first remainder signals will have components of magnitude due to a correlation of the mutually coherent undesired and desired signal components which are of equal magnitude but opposite polarity.

Further, under these conditions and as represented by FIGURES 5(d) and (h), the timing of signals A″ and $B_2'$ is such that the magnitude of the third output signal will be of substantially zero magnitude, the mutually coherent desired and undersired signal components being out of timing agreement. Thus, the second remainder signal will be substantially equal to the fourth output signal. As previously mentioned, the fourth output signal is developed by a correlation of signals A′ and $B_2''$. As represented by FIGURES 5(a) and (j), the timing of signals A′ and $B_2''$ is such that the magnitude of the fourth output signal is due entirely to a correlation of the mutually coherent undesired signal components. Further, it is to be noted that the magnitude of the fourth output signal will be substantially equal to the portion of magnitude of the first remainder signal which is due to a correlation of the mutually coherent undesired signal components. Therefore, since the second remainder signal is equal to the fourth output signal, a subtraction of first and second remainder signals will yield a control signal having a magnitude substantially equal to only that component of magnitude of the first remainder signal which is due to a correlation of mutually coherent desired signal components and having a negative polarity. As previously discussed, application of such a control signal to the servo control means 50 will produce automatic control of the coupler 46 of delay network 18 such that the desired signal components of signal $B_1'$ will be brought into and continuously remain in timing agreement with the desired signal components of A′. In a like manner, if signals $B_1'$ and $B_2'$ had been retarded and advanced by too great a magnitude of time, a control signal of positive polarity would have been developed to bring the mutually coherent desired signal components of signals $B_1'$ and A′ into timing agreement.

Referring now to FIGURE 6, there is represented still another form of measuring system, in accordance with the present invention, which provides means for automatically measuring the unknown magnitude of timing displacement between mutually coherent desired signal components. As illustrated in FIGURE 6, this form of measuring system corresponds substantially to that represented in FIGURE 1, as to delay means 16 and delay network 18. Thus, signal A′ is developed at terminal 24, signal $B_1'$ at terminal 20 and signal $B_2'$ at terminal 22. In this form of the present invention, to develop a control signal which, when applied to terminal 49 of servo control means 50, will provide means for automatically controlling the magnitude of time by which the signal versions are respectively advanced and retarded, means are first provided for selectively modulating at a reference timing rate the magnitude of time advancement and retardation of signals $B_1'$ and $B_2'$ relative to signal A′. As modulated, signals $B_1'$ and $B_2'$ are then separately correlated with signal A′ to produce first and second output signals, the magnitude of which will vary with the changing values of time advancement and retardation. Then, in accordance with this form of the present invention, the timing of the output signals is compared with the reference timing rate to develop the desired control signal.

More particularly, as illustrated in FIGURE 6, the signal versions (signals $B_1'$ and $B_2'$) are applied to a delay modulation device 68 which will selectively modulate the magnitude of time by which the signal versions are respectively advanced and retarded. Further, in accordance with this form of the present invention, the magnitude of time by which the signal versions are advanced and retarded is varied at the reference timing rate over like ranges of value.

Still further, as the timing of a one of the signal versions is being advanced, the timing of the other signal version is being retarded. Thus, a correlation of the time-varying signal versions developed by delay modulation device 68 with a signal version of signal A′ will develop first and second time-varying output signals. By subtracting the first and second output signals, a remainder signal will be developed which, in accordance with the present invention, corresponds substantially only to a correlation of the desired signal components. However, in this form of the present invention, due to the time-varying delay characteristics of the output signals, the magnitude of the remainder signal will also be varied with time as a function of the delay variation introduced by delay modulation device 68. Then, as represented, to develop the desired control signal, the timing of the remainder signal is compared with the reference timing rate by an averaging phase detector 86.

Specifically, as illustrated by FIGURE 6, to develop such a delay modulation of the signal versions relative to signal A′, signal A′ is delayed by a fixed magnitude of time $x_1$, by fixed delay means 70 to develop a signal A‴. Signals $B_1'$ and $B_2'$ are applied to delay modulation device 68. As represented in FIGURE 6, in one form of delay modulation device 68, signal $B_1'$ is applied to a first electrically controllable delay means 72. As signal $B_1'$ is applied to delay means 72, signal $B_2'$ is applied to a second electrically controllable delay means 74. In accordance with this form of the present invention, delay means 72 and 74 are so constructed as to have a mean magnitude of time delay equal to the fixed magnitude of delay $x_1$. Further, to selectively control the magnitude of time delay presented by variable delays 72 and 74, signals are applied to control terminals 76 and 78, respectively. In accordance with the form of modulation device 68 represented in FIGURE 6, to vary the delay presented by the variable delay means over like ranges of magnitude, electrical signals varying at a reference timing rate are developed by a modulator 80 and applied to terminals 76 and 78, respectively. Further, to control the magnitude of delay introduced by the variable delay means such that as the timing of a one of the signal versions is advanced, the timing of the other signal version is retarded, these electrical signals, although being of like magnitude, are of opposite polarity.

More particularly, to develop such electrical signals, the modulator 80 comprises a fixed frequency signal source 82, the output of which is applied to a terminal 84 of an averaging type phase detector 86 and also to a primary winding 88 of a transformer 90. As illustrated in FIGURE 6, a secondary winding 92 of transformer 90, which is connected between the control terminals 76 and 78 of the variable delay means, is center-tapped to ground. Thus, as represented, a reference timing signal depicted at 94, upon being generated at source 82, will develop at the control terminals electrical signals as represented at 96 and 98 having a like magnitude but opposite polarity. Then, in response to the signals developed at terminals 76 and 78, the magnitude of delay presented respectively by delay means 72 and 74 will vary about the magnitude of delay $x_1$ at the reference timing rate. Further, due to the opposite polarity of the signals applied to control terminals 76 and 78, the magnitude of delay introduced at signal $B_1'$ will be decreased, while the magnitude of delay introduced into signal $B_2'$ will be increased. Thus, at terminals 100 and 102, time delay modulated versions of signals $B_1'$ and $B_2'$, represented respectively as signals $B_1'''$ and $B_2'''$ will be developed.

As illustrated in FIGURE 6, to develop the first and second output signals, signal A‴ is correlated with signal $B_1'''$ at a correlator 104 and with signal $B_2'''$ at a correlator 106. The first and second output signals are then subtracted by a subtracter 108 to develop the aforementioned time-varying remainder signal. As shown, the remainder signal is applied to the averaging phase detector 86 where the timing thereof is compared with the timing of the reference timing signal generated by source 82. In accordance with this form of the present invention, if the desired signal component of signal A' and one of the signal versions are in timing agreement, the magnitude of the control signal developed by phase detector 86 will be of substantially zero magnitude. However, if the desired signal components of signal A' and a one of the signal versions are not in timing agreement, the control signal will be of a magnitude and polarity which will represent the magntiude of timing displacement between the desired signal components of signal A' and the one of the signal versions. Thus, by applying the developed control signal to the servo control means 50, means are provided whereby coupler 46 of delay network 18 is automatically controlled. Therefore, as previously mentioned, the signal versions will be advanced and retarded relative to signal A' such that the desired signal components of a one of the signal versions will be continuously in timing agreement with the desired signal components of signal A'.

Thus, it follows from the above that in the form of the invention illustrated in FIGURE 6, an observation of the absolute value of time advancement and retardation introduced by delay network 18, as indicated at indicator means 36, will continuously indicate the remaining unknown magnitude of timing displacement between the desired signal components. Therefore, a combination of the measured remaining unknown magnitude of timing displacement with the known fixed magnitude of timing displacement will determine the initial unknown magnitude of timing displacement.

The operation of modulator device 68 to develop signals $B_1'''$ and $B_2'''$ may be more clearly understood by reference to FIGURES 7(a) through 7(f) which represent in graphical form the operation of the apparatus of FIGURE 6 when the desired signal components of signal $B_1'$ and A' are in timing agreement. More particularly, FIGURE 7(a) represents, in graphical form, signal A' which is developed at terminal 24 of FIGURE 6. FIGURE 7(b) represents, in graphical form, signal $B_1'$ which is developed at terminal 20 of FIGURE 6. FIGURE 7(c) represents, in graphical form, signal $B_2'$ which is developed at terminal 22.

As mentioned above, to modulate the magnitudes of time by which the signal versions are respectively advanced and retarded, signal A' is delayed by a fixed magnitude of delay $x_1$ by fixed delay means 70. This develops a delayed version of signal A', signal A''' at a terminal 110 in FIGURE 6—signal A''' being represented, in graphical form, in FIGURE 7(d). Further, as represented in FIGURE 6, signal $B_1'$ is applied to a variable delay means 72 having a mean magnitude of delay substantially equal to the fixed delay $x_1$. As previously described, the magnitude of delay presented by variable delay means 72 is varied or modulated about the mean magnitude of time delay. Thus, the signal $B_1'$ will be delayed with time over a range of values of delay to produce a modulated signal version of signal $B_1'$ (signal $B_1'''$ —), the signal $B_1'''$ being represented, in graphical form, in FIGURE 7(e). As illustrated in FIGURE 7(e), due to the delay modulation, the undesired and desired signal components of signal $B_1'''$ will vary over a range of time delay substantially as represented by the solid and dotted line rectangles. Similarly, signal $B_2'$ is applied to a variable delay means 74. As previously mentioned, variable delay means 74 is also constructed to have a mean value of delay substantially equal to the fixed delay $x_1$. Thus, the magnitude of delay presented by delay means 74 will vary also at the reference timing rate over a range of delay values about the mean value of delay. Therefore, signal $B_2'$, upon being applied to variable delay means 74, will be delayed by varying magnitudes of time to develop modulated signal version $B_2'''$ at terminal 102—signal $B_2'''$ being represented in graphical form in FIGURE 7(f). As illustrated, the undesired and desired signal components of signal $B_2'''$ will be delayed with time over a range of values represented as being between the solid and dotted line rectangles shown in FIGURE 7(f).

As discussed in connection with FIGURE 6, upon correlating signal A''' with signals $B_1'''$ and $B_2'''$, first and second output signals will be produced, the magnitude of which will vary in time as a function of the time delay introduced by the variable delay means 72 and 74, respectively. Thus, at a first instant of time, signals $B_1'''$ and $B_2'''$ are as represented by the solid line rectangles of FIGURES 7(e) and (f). At this instant of time, due to the timing agreement of signals A''' and $B_1'''$, as represented by FIGURES 7(d) and 7(e), a correlation thereof will produce an output signal which is entirely due to a signal correlation of the mutually coherent desired signal components contained in signals A''' and $B_1'''$. Likewise, at this instant of time, as will be seen by observing FIGURES 7(d) and (f), a correlation of signal $B_2'''$ with signal A''' will produce an output signal of substantially zero magnitude.

At a second instant of time, signals $B_1'''$ and $B_2'''$ will be as represented by the dotted line rectangles illustrated in FIGURES 7(e) and (f). At this instant of time, a correlation of signal $B_1'''$ and signal A''' will result in an output signal which is primarily due to a signal correlation of the mutually coherent desired signal components and secondarily due to a correlation of the mutually coherent undesired signal components respectively contained in signals A''' and $B_1'''$. Further, at this instant of time, a correlation of signal $B_2'''$ and signal A''' will, as may be seen by reference to FIGURES 7(d) and (f), result in an output signal which is entirely due to a signal correlation of the mutually coherent undesired signal components present in signal A''' and signal $B_2'''$. Still further, it is to be noted that the magnitude of the output signal developed at this instant of time by a correlation of signals A''' and $B_2'''$ will be substantially equal to the portion of the output signal developed by a correlation of signals A''' and $B_1'''$ which is due to a correlation of the mutually coherent undesired signal components. Thus, when the mutually coherent desired signal components of signals A' and $B_1'$ are in timing agreement, a subtraction of the first and second output signals at the first and second instances of time will result in instantaneous values of a remainder signal which are of equal magnitude (substantially due to only a correlation of the mutually coherent desired signal components). Further, as the magnitude of delay introduced into the signal versions is modulated by the modulation device 68, the magnitude of this remainder signal will vary with time between these equal values of signal magnitude as a function of the delay modulation introduced into the mutually coherent desired signal components. Thus, when the desired signal components of a one of the signal versions and signal A' have been brought into timing agreement by the delay network 18 of FIGURE 6, a timing comparison of the remainder signal with the reference timing signal will develop a control signal of substantially zero magnitude.

It is to be noted, however, that if the desired signal components of a one of the signal versions and signal A' have not been brought into timing agreement by delay network 18, the magnitude of the remainder signal will be due to both a correlation of mutually coherent desired, as well as mutually coherent undesired, signal components. Thus, under such conditions, a timing displacement will exist between the remainder signal developed by subtracter 108 and the reference timing signal developed by modulator 80. Therefore, a control signal having a magnitude and polarity proportional to this timing displacement will be developed. An example of a situation wherein the signal versions have not been advanced and retarded relative to signal A' by a sufficient magnitude of time to bring the mutually coherent desired signal components of a one of the signal versions and signal A' into timing agreement is represented in FIGURES 7(g) and 7(h). As illustrated, the timing displacement between the desired and undesired signal components of signals $B_1'''$ and $B_2'''$, and the desired and undesired signal components of signal $A'''$, is such that the magnitude of the first output signal at the first instant of time (represented by the solid line rectangles) will be due primarily to a correlation of the mutually coherent desired signal components of signals $A'''$ and $B_1'''$ and secondarily due to a correlation of the mutually coherent undesired signal components. Further, at the first instant of time, the magnitude of the second output signal will be substantially zero. Therefore, the magnitude of the remainder signal will be due to both a correlation of the mutually coherent desired and undesired signal components.

At the second instant of time (represented by the dotted line pulse representations), the magnitude of the first output signal is due primarily to a correlation of the mutually coherent undesired signal components and secondarily due to a correlation of the mutually coherent desired signal components. Further, at the second instant of time, it is noted from FIGURES 7(d) and (h) that the magnitude of the second output signal will be due entirely to a correlation of the mutually coherent undesired signal components of signals $A'''$ and $B_2'''$. Still further, the magnitude of the first and second output signals at the second instant of time is such that the magnitude of the remainder signal will be due equally to a correlation of the mutually coherent desired and mutually coherent undesired signal components. However, due to the presence of the portions of magnitude caused by a correlation of the undesired signal components, the magnitude of the remainder signal at the second instant of time will not be equal to the magnitude of the remainder signal at the first instant of time. Thus, a timing displacement will exist between the remainder signal and the reference timing signal. Therefore, a comparison of the timing of the remainder signal and the reference timing signal will result in a control signal, the magnitude and polarity of which will represent an indication of the magnitude of timing displacement between the remainder signal and the reference timing signal. Further, since the timing displacement between the remainder signal and the reference timing signal is an accurate indication of the timing displacement between the desired signal components of a one of the signal versions and signal A', the control signal thus developed will be an accurate indication of the timing displacement between the desired signal components of a one of the signal versions and signal A'. Therefore, the control signal may be utilized as described in connection with FIGURE 6 to provide accurate automatic control of the magnitude of time advancement and retardation introduced by delay network 18.

Although, as described, the control signal developed by the apparatus of FIGURE 6 is developed by comparing the timing of the remainder signal with the reference timing signal, it is to be understood that the desired control signal could also be developed by subtracting signals produced by a separate comparison of the output signals with the reference timing signal.

Referring to FIGURE 8, there is illstrated a form of delay modulation device suitable for use in the embodiment of the present invention, as illustrated in FIGURE 6. As represented in FIGURE 8, this form of modulation device 68 may be utilized when mechanically variable delay means, such as sonic or ultrasonic delay lines are being utilized to modulate the magnitude of time by which signal versions $B_1'$ and $B_2'$ are respectively advanced and retarded. Specifically, modulator device 68 of FIGURE 8 includes a pair of mechanically variable delay means 112 and 114. Variable delay means 112 is coupled between terminals 20 and 100. Delay means 114 is connected between terminals 22 and 102. As represented in FIGURE 8, the magnitude of delay presented by variable delay means 112 and 114 is controlled by respectively varying the lateral position of contacts 116 and 118.

In accordance with the form of the present invention illustrated in FIGURE 6, to control the magnitude of delay introduced by these variable delay means, such that the magnitude of delay presented by a one is increasing while the magnitude of delay presented by the other is decreasing, contacts 116 and 118 are mechanically coupled to a modulator represented by the dotted line rectangle 120. As shown in FIGURE 8, modulator 120 includes a source of reference timing signals 122, the output of which is coupled both to terminal 84, as well as to a motor 124. The reference timing signal excites a rotational output of motor 124 as represented by arrow 126. As illustrated, the rotational output of motor 124 is mechanically coupled to a gear train 128. The mechanical output of motor 124 is converted by gear train 128 into such mechanical motion as will vary the position of contacts 116 and 118, as represented by arrows 130 and 132, such that the contacts 116 and 118 are continuously moved in opposite lateral directions. Thus, a signal $B_1'$, upon being applied to terminal 20, will be delayed by magnitudes of time which vary over a range of values determined by the movement of contact 116 along variable delay means 112. Likewise, a signal $B_2'$ upon being applied to terminal 22 will be delayed by magnitudes of time which vary over a range of values determined by the movement of contact 118 along the surface of delay means 114. Since the contacts 116 and 118 are continuously moved in opposite lateral directions, as the magnitude of time delay introduced into signal $B_1'$ is increasing, the magnitude of time delay introduced into signal $B_2'$ is decreasing. Therefore, as described in connection with FIGURE 6, signals $B_1'''$ and $B_2'''$ are respectively developed at terminals 100 and 102 which may be utilized to develop the desired control signal.

Referring now to FIGURE 9, there is illustrated a preferred form of delay network 18 which may be utilized in all forms of the present invention. As represented in FIGURE 9, delay network 18 utilizes a magnetic storage element to introduce both a fixed delay into signal A, as well as to develop signal versions of signal B' which are delayed by magnitudes of delay which are a controllable magnitude of time greater and less than the magnitude of fixed time delay associated with signal A.

More particularly, as illustrated, delay network 18 includes a magnetic drum 134. Drum 134 is rotated at a substantially constant angular velocity, as represented by arrow 136, about its axis of rotation, represented at 138, by a motor drive (not shown). Signal A, which is developed at terminal 10, is recorded on a first record track 140 (shown in FIGURE 9(a)) of drum 134 by a first recording means represented by record head 142. Associated with first recording means 142 is an erase head 144 which neutralizes the recording surface of drum 134 prior to recording of signal A thereon. Signal A, as recorded on drum 134, is received by a first playback means represented by playback head 146 and applied to terminal 24. As illustrated, recording means 142 is displaced from playback means 146 by a fixed peripheral displacement $\overline{A}$. Thus, signal A is delayed by a fixed magnitude of time equal to the time required for drum 134 to rotate through a peripheral displacement represented by $\overline{A}$, to develop a signal A'.

Also, as represented in FIGURE 9, signal B' is applied to terminal 14. Further, a first signal version of signal B', signal $B_1'$ is recorded on a second record track 148 (shown in FIGURE 9(a)) of drum 134 by a second recording means represented by record head 150. Associated with recording means 150 is an erase head 152 which neutralizes the surface of drum 134 prior to the recording of signal $B_1'$ thereon. As represented, signal $B_1'$ is received by a second playback means, represented by playback head 154, which is displaced by a peripheral displacement $\overline{B}$ from receiving means 150. Thus, signal $B_1'$ is delayed by a magnitude of time equal to that required for drum 134 to rotate through a peripheral displacement equal to $\overline{B}$. Further, in accordance with the present invention, a second signal version of signal B' is developed and recorded on a third record track 156 (shown in FIGURE 9(a)) of drum 134 by a third recording means represented by record head 158. Associated with record head 158 is an erase head 160 which neutralizes the surface of the drum prior to the recording of signal $B_2'$ thereon. As represented, signal $B_2'$ is received by a third playback means represented by playback head 162. As illustrated, playback head 162 is displaced from recording means 158 by a peripheral displacement $\overline{C}$. Thus, signal $B_2'$ is delayed by a magnitude of time equal to that required for drum 134 to rotate through a peripheral displacement $\overline{C}$. In accordance with the present invention, recording means 150 and playback means 162 are mounted upon a coupler 164 such that peripheral displacement $\overline{B}$ and $\overline{C}$ may be simultaneously adjusted as represented by arrow 166. Thus, for example, as peripheral displacement $\overline{C}$ is increased, peripheral displacement $\overline{B}$ will be decreased. Further, it is to be noted that the peripheral displacements $\overline{B}$ and $\overline{C}$ may be selectively controlled by coupler 164 about a peripheral displacement substantially equal to $\overline{A}$. Thus, in effect, signals $B_1'$ and $B_2'$ will be respectively retarded and advanced in time relative to signal A' by a controllable magnitude of time equal to the difference between the fixed peripheral displacement $\overline{A}$ and the peripheral displacements $\overline{B}$ and $\overline{C}$. Therefore, as described, the preferred form of delay network 18 may be controlled by the mechanical output of servo control means 50 by selectively rotating the position of coupler 164 relative to recording means 142. Thus, the output of servo control means 50 may be utilized to continuously adjust the magnitude of time delay associated with the preferred form of delay network 18 such that the desired signal components of a one of the signal versions and signal A' will be continuously in timing agreement.

As described in connection with FIGURE 9, the control of coupler 164 is provided by the mechanical output of servo control means 50. The means by which this control is provided may be more clearly understood by reference to FIGURE 9(a) which illustrates a partial side view of the preferred delay network of the present invention. As shown, coupler 164 is centered about the axis of rotation 138 of drum 134 and is mounted for free rotation about axis 138 by a bearing arrangement represented at 168. Further, as illustrated, coupler 164 is connected to the servo control means 50 by a drive shaft represented at 170. Thus, as coupler 164 is rotated in response to the mechanical drive output of servo control means 50, the magnitude of the peripheral displacements $\overline{B}$ and $\overline{C}$ are simultaneously controlled. Therefore, in accordance with the present invention, a rotation of coupler 164 will simultaneously control the magnitude of time by which the signal versions respectively lead and lag signal A'.

Referring now to FIGURE 10, there is illustrated in block diagram form an embodiment of servo control means 50 for use in the present invention. As illustrated, servo control means 50 includes a motor drive 172 which is mechanically coupled to a gear train 174. In operation, the control signal is applied to motor drive 174 where it is transduced into mechanical energy which causes a controlled rotational output of motor drive 172. This rotational output is mechanically coupled to gear train 174 where in one form of the present invention it is converted into movement which will cause a lateral movement of the contacts associated with the delay device 18 as illustrated in FIGURE 1, and in another form, will cause a rotational movement of the coupler of delay device 18 as illustrated in FIGURE 9. Further, the mechanical output of gear train 174 is also coupled to indicator means 36 which, as will be described in connection with FIGURE 12, provides means which accurately indicate the remaining unknown magnitude of timing displacement between the mutually coherent desired signal components.

The operation of servo control means 50 may be more clearly understood by reference to FIGURE 11 which illustrates one form of motor drive useful in the embodiment shown in FIGURE 10. As illustrated, the motor drive unit illustrated in FIGURE 11 includes a relay device 176 and a D.-C. motor 178. As represented, control signals applied to terminal 49 are processed by relay device 176 as to excite selective rotational output in the D.-C. motor 178. Thus, if a positive control signal is applied to terminal 49, a rotational output will be developed by motor 178 as illustrated by arrow 180. Likewise, if a negative control signal is developed at terminal 49, a rotational output as illustrated by arrow 182 will be developed by motor 178.

More particularly, as shown in FIGURE 11, the relay device 176 includes a neutrally balanced relay the armature of which will be selectively positioned in contact with a one of a pair of spaced terminals in response to control signals of different polarity developed at terminal 49. Specifically, relay device 176 comprises a resistor 184 connected to terminal 49. Resistor 184 is coupled to ground through two parallel paths. A first one of the paths includes a diode 186 in series with an electromagnet 188. The other path includes a diode 190 connected in series with an electromagnet 192. As illustrated, diodes 186 and 190 are oppositely biased such that when a positive control signal is developed at terminals 49, it will pass only through diode 186 and electromagnet 188, whereas when a negative control signal is developed at terminal 49, current will pass only through a diode 190 and electromagnet 192. Relay device 176 further includes an armature 194 which is initially balanced between electromagnets 188 and 192, as represented by springs 196 and 198. Associated with armature 194 and spaced equidistant therefrom are contacts 200 and 202. These contacts are so positioned that when a positive control signal is applied at terminal 49 (which will excite electromagnet 188) armature 194 will close against contact 200. Similarly, when a negative control signal is applied at terminal 49, armature 194 will close against contact 202. As represented in FIGURE 11, contact 200 is coupled through a field winding 204 to the armature of motor 178. Further, contact 202 is coupled through a field winding 206 to the armature of motor 178. As illustrated, to excite a current flow through motor 178, a power supply represented by battery 208 is connected between motor 178 and armature 194 of relay device 176.

Specifically, in operation, as armature 194 impinges upon contact 200 in response to a positive control signal, current will flow from battery 208 to contact 200 and through motor 178 in the direction represented by arrow 210, thus causing a rotational output represented by arrow 180. When armature 194 impinges upon contact 202 in response to a negative control signal being applied at terminal 49, current will flow from battery 208 to contact 202 and through motor 178 as indicated by arrow 210 thereby producing a rotational output as indicated by arrow 182. Thus, from the above description, it is noted that the magnitude and polarity of a control signal applied to motor drive 172 will induce selective rotational output which may be converted by gear train 174 of FIGURE 10 to selectively control the magnitude of time by which the signal versions are respectively advanced and retarded relative to signal A'.

Referring now to FIGURE 12, there is illustrated one form of indicator unit 36 useful in the present invention. As represented, indicator 36 includes a variable resistor 212 coupled between the positive and negative terminals of a battery power supply 214. Further, as represented, a contact 216 is associated with resistor 212, the position of which may be varied along resistor 212 in response to the mechanical output of gear train 174. As illustrated, a volt meter 218 is connected between contact 216 and the positive terminal of battery 214. Thus, as the position of contact 216 along resistor 212 is varied in response to the mechanical output of gear train 174, the voltage indicated at volt meter 218 will be varied. Therefore, by calibrating volt meter 218 with the magnitude of time by which the signal versions are respectively advanced and retarded by delay device 18, the remaining unknown magnitude of timing displacement between the mutually coherent desired signal components may be directly observed.

What is claimed is:

1. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement comprising in combination:

means for delaying a one of said signals such that said undesired signal components are brought into timing agreement;
means for developing a delayed version of said second signal;
means for developing first and second signal versions of said first signal which are respectively retarded and advanced relative to said delayed version of said second signal by a like controllable magnitude of time;
means for selectively changing said controllable magnitude of time to bring the desired signal components of a first one of said signal versions and said delayed version of said second signal into timing agreement;
means for correlating said first signal version with said delayed version of said second signal to develop a first output signal;
means for correlating said second signal version with said delayed version of said second signal to develop a second output signal;
means responsive to said first and second output signals for developing a remainder signal, the magnitude of which represents a measure of the timing displacement between the desired signal components of said first one of said signal versions and said delayed version of said second signal; and
means for measuring said controllable magnitude of time such that when said desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

2. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement comprising in combination:

means for delaying a one of said signals such that undersired signal components are brought into timing agreement;
means for developing a delayed version of said second signal;
means for developing first and second signal versions of said first signal which are respectively retarded and advanced relative to said delayed version of said second signal by a like controllable magnitude of time;
means for correlating said first signal version with said delayed version of said second signal to develop a first output signal;
means for correlating said second signal version with said delayed version of said second signal to develop a second output signal;
means responsive to said first and second output signals for developing a remainder signal, the magnitude of which represents a measure of the timing displacement between the desired signal components of a first one of said signal versions and said delayed version of said second signal;
means responsive to said remainder signal for selectively changing said controllable magnitude of time such that the desired signal components of said first one of said signal versions and said delayed version of said second signal will be continuously in timing agreement; and
means for measuring said controllable magnitude of time such that when said desired signal components of the first one of said signal versions and said delayed version of said second signal are in timing agreement said controllable magniutde of time when taken in combination with said known fixed magnitude of timing displacement will represent an accurate measure of the unknown magnitude of timing displacement.

3. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement comprising in combination:

means for delaying a one of said signals such that said undesired signal components are brought into timing agreement;
means for developing a delayed version of said second signal;
means for developing first and second signal versions of said first signal which are respectively retarded and advanced relative to said delayed version of said second signal by a like controllable magnitude of time;
means for shifting the phase of substantially all monofrequency components of said delayed version of said second signal by 90°;
means for correlating said first signal version with said delayed version of said second signal to develop a first output signal;
means for correlating said first signal version with said delayed version of said second signal to develop a second output signal;
means responsive to said first and second output signals for developing a remainder signal the magnitude of which represents a measure of the timing displacement between the desired signal components of a first one of said signal versions and said delayed version of said second signal;
means responsive to said remainder signal for selectively changing said controllable magnitude of time such that the desired signal components of said first one of said signal versions and said delayed version of said second signal will be continuously in timing agreement; and
means for measuring said controllable magnitude of time such that when the desired signal components of said first one of said signal versions and said delayed version of said second signal are in timing agreement said controllable magnitude of time when taken in combination with said known fixed magnitude of timing displacement will represent an accurate measure of the unknown magnitude of timing displacement.

4. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement comprising in combination:

means for delaying a one of said signals such that the undesired signal components are brought into timing agreement;

means for developing a delayed version of said second signal;

means for developing first and second signal versions of said first signal which are respectively retarded and advanced relative to said delayed version of said second signal by a like controllable magnitude of time;

means for separately retarding and advancing each of said signal versions by a fixed magnitude of time relative to said delayed version of said second signal to develop respectively first and second, retarded and advanced signal versions;

means for correlating said first retarded signal version with said delayed version of said second signal to develop a first output signal;

means for correlating said first advanced signal version with said delayed version of said second signal to develop a second output signal;

means for correlating said second advanced signal version with said delayed version of said second signal to develop a third output signal;

means for correlating said second retarded signal version with said delayed version of said second signal to develop a fourth output signal;

means for subtracting said first and second output signals to develop a first remainder signal;

means for subtracting third and fourth output signals to develop a second remainder signal;

means for subtracting said first and said second remainder signals to develop a control signal, the magnitude of which represents the timing displacement between the desired signal components of a first one of said signal versions and said delayed version of said second signal;

servo control means responsive to said control signal for selectively changing said controllable magnitude of time such that the desired signal components of said first one of said signal versions and said delayed version of said second signal will be continuously in timing agreement; and means for measuring said controllable magnitude of time such that when the desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

5. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that the undesired signal components are in timing agreement;

means for developing a delayed version of said second signal;

means for developing first and second signal versions of said first signal which are respectively retarded and advanced relative to said delayed version of said second signal by a like controllable magnitude of time;

means for modulating at a reference timing rate said controllable magnitude of time such that the time advancement and retardation of said signal versions will vary over like ranges of time values about said controllable magnitude of time;

means for correlating said first signal version with said delayed version of said second signal to develop a first output signal;

means for correlating said second signal version with said delayed version of said second signal to develop a second output signal;

means responsive to said output signals for developing a control signal the magnitude and polarity of which represents a measure of the timing displacement between the desired signal components of a first one of said signal versions and said delayed version of said second signal;

means responsive to said control signal for changing said controllable magnitude of time such that the desired signal components of said first one of said signal versions and said delayed version of said second signal will be continuously in timing agreement; and means for measuring the controllable magnitude of time such that when the desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

6. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that the undesired signal components are in timing agreement;

means for developing a delayed version of said second signal;

means for developing first and second signal versions of said first signal which are respectively retarded and advanced relative to said delayed version of said second signal by a like controllable magnitude of time;

means for modulating at a reference timing rate said controllable magnitude of time such that the timing of said signal versions will vary over like ranges of time values about said controllable magnitude of time;

means for correlating said first signal version with said delayed version of said second signal to develop a first output signal;

means for correlating said second signal version with said delayed version of said second signal to develop a second output signal;

means for subtracting said output signals to develop a remainder signal, the magnitude of which represents a measure of the timing displacement between the desired signal components of a first one of said signal versions and said delayed version of said second signal;

means for comparing the timing of said remainder signal with said reference timing rate to develop a control signal;

means responsive to said control signal for changing said controllable magnitude of time such that the desired signal components of said first one of said signal versions and said delayed version of said second signal will be continuously in timing agreement; and means for measuring the controllable magnitude of time such that when the desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

7. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that said undesired signal components are brought into timing agreement;

a delay network including means for delaying said second signal by a fixed magnitude of time to develop a delayed version of said second signal and variable delay means for developing first and second signal versions of said first signal which are delayed by a controllable magnitude of time greater and less than said fixed magnitude of time delay;

means for selectively changing said controllable magnitude of time to bring the desired signal components of a first one of said signal versions and said delayed version of said second signals into timing agreement;

means for correlating said first signal version with said delayed version of said second signal to develop a first output signal;

means for correlating said second signal version with said delayed version of said second signal to develop a second output signal;

means for subtracting said output signals to develop a remainder signal, the magnitude of which represents a measure of the timing displacement between the desired signal components of said first one of said signal versions and said delayed version of said second signal; and means for measuring said controllable magnitude of time such that when said desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

8. A measuring system for measuring an unknown magnitude of timing displacement between a desired signal component of a first time-varying electrical signal and a mutually coherent desired signal component of a second time-varying electrical signal, where said first and second signals include undersired signal components which are mutually coherent and displaced by a known fixed magnitude of timing displacement, comprising in combination:

means for delaying a one of said signal versions such that undersired signal components are brought into timing agreement;

a delay network including means for delaying said second signal by a fixed magnitude of time to develop a delayed version of said second signal and variable delay means for developing first and second signal versions of said first signal which are delayed by a controllable magnitude of time greater and less than said fixed magnitude of time delay;

means for correlating said first signal version with said delayed version of said second signal to develop a first output signal;

means for correlating said second signal version with said delayed version of said second signal to develop a second output signal;

means for subtracting said output signals to develop a remainder signal, the magnitude of which represents a measure of the timing displacement between the desired signal components of a first one of said signal versions and said delayed version of said second signal;

means responsive to said remainder signal for selectively changing said controllable magnitude of time such that the desired signal components of said first one of said signal versions and said delayed version of said second signal will be continuously in timing agreement; and means for measuring said controllable magnitude of time such that when said desired signal components of the first one of said signal versions and said delayed version of said second signal are in timing agreement, said controllable magnitude of time when taken in combination with said known fixed magnitude of timing displacement will represent an accurate measure of the unknown magnitude of timing displacement.

9. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that said undesired signal components are brought into timing agreement;

a delay network including means for delaying said second signal by a fixed magnitude of time to develop a delayed version of said second signal and variable delay means for developing first and second signal versions of said first signal which are delayed by a controllable magnitude of time greater and less than said fixed magnitude of time delay;

means for shifting the phase of substantially all monofrequency components of said delayed version of said second signal by 90°;

means for correlating said first signal version with said delayed version of said second signal to develop a first output signal;

means for correlating said second signal version with said delayed version of said second signal to develop a second output signal;

means for subtracting said output signals to develop a remainder signal the magnitude of which represents a measure of the timing displacement between the desired signal components of a first one of said signal versions and said delayed version of said second signal;

means responsive to said remainder signal for selectively changing said controllable magnitude of time such that the desired signal components of said first one of said signal versions and said delayed version of said second signal will be continuously in timing agreement; and means for measuring said controllable magnitude of time such that when the desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

10. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that the undesired signal components are in timing agreement;

a delay network including means for delaying said second signal by a fixed first magnitude of time to develop a delayed version of said second signal and variable delay means for developing first and second signal versions of said first signal which are delayed by a controllable magnitude of time greater and less than said fixed magnitude of time delay;

means for delaying said first signal version by a fixed second magnitude of time to develop a first delay signal;

means for correlating said first delay signal with said delayed version of said second signal to develop a first output signal;

means for delaying said delayed version of said second signal by said second fixed magnitude of time to develop a second delay signal;

means for correlating said second delay signal with said first signal version to develop a second output signal;

means for correlating said second delay signal with said second signal version to develop a third output signal;

means for delaying said second signal version by the fixed magnitude of time to develop a third delay signal;

means for correlating said third delay signal with said delayed version of said second signal to develop a fourth output signal;

means for subtracting said first and second output signals to develop a first remainder signal;

means for subtracting third and fourth output signals to develop a second remainder signal;

means for subtracting said first and second remainder signals to develop a control signal, the magnitude of which represents the timing displacement between the desired signal component of a first one of said signal versions and said delayed version of said second signal;

servo control means responsive to said control signal for selectively changing said controllable magnitude of time such that the desired signal components of said first one of said signal versions and said delayed version of said second signal will be continuously in timing agreement; and means for measuring said controllable magnitude of time such that when the desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

11. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that the undesired signal components are in timing agreement;

a delay network including means for delaying said second signal by a fixed magnitude of time to develop a delayed version of said second signal and variable delay means for developing first and second signal versions of said first signal which are delayed by a controllable magnitude of time greater and less than said fixed magnitude of time delay;

means for modulating at a reference timing rate said controllable magnitude of time such that the timing of said signal versions will vary over like ranges of time values about said controllable magnitude of time;

means for correlating said first signal version with said delayed version of said second signal to develop a first output signal;

means for correlating said second signal version with said delayed version of said second signal to develop a second output signal;

means responsive to said output signals for developing a control signal, the magnitude and polarity of which represents a measure of the timing displacement between the desired signal components of a first one of said signal versions and said delayed version of said second signal;

means responsive to said control signal for changing said controllable magnitude of time such that the desired signal components of said first one of said signal versions and said delayed version of said second signal will be continuously in timing agreement; and means for measuring the controllable magnitude of time such that when the desired signal components of said first one of said signal versions and said delayed version of said second signal are in timing agreement, said controllable magnitude of time when taken in combination with said known fixed magnitude of timing displacement will represent an accurate measure of the unknown magnitude of timing displacement.

12. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signal versions such that undesired signal components are brought into timing agreement;

a delay network including a magnetic drum mounted for movement about its axis of rotation, a first recording means positioned on the periphery of said drum for recording said second signal on said drum, a first playback means positioned on the periphery of said drum at a fixed peripheral displacement from said first recording means for receiving a version of said second signal which is being delayed by a fixed magnitude of time, a second recording means positioned on the periphery of said drum for recording a first signal version of said first signal on said drum, a second playback means associated with and displaced on the periphery of said drum from said second recording means for receiving said first signal version, said second playback means being mounted for movement about the periphery of said drum so that said first signal version is delayed by a controllable magnitude of time greater than said fixed magnitude of time, a third recording means positioned on the periphery of said drum and connected in series with said second recording means for recording a second signal version of said first signal on said drum, a third playback means associated with and displaced on the periphery of said drum from said third recording means for receiving said second signal version, said third recording means being mounted for movement about the periphery of said drum such that said second signal version is delayed by the controllable magnitude of time less than said fixed magnitude of time, coupling means connected to said second playback means and said third recording means for providing means for selectively changing said controllable magnitude of time such that the desired signal components of a first one of said signal versions and said version of said second signal may be brought into timing agreement;

means for correlating said first signal version with said version of said second signal to develop a first output signal;

means for correlating said second signal version with said version of said second signal to develop a second output signal;

means for subtracting said output signals to develop a remainder signal, the magnitude of which represents a measure of the timing displacement between the desired signal components of said first one of said signal versions and said version of said second signal;

servo control means responsive to said remainder signal for selectively controlling said coupling means such that the desired signal components of said first one of said signal versions and said version of said second signal will be continuously in timing agreement; and means for measuring said controllable magnitude of time such that when said desired signal components of the first one of said signal versions and said version of said second signal are in timing agreement, said controllable magnitude of time when taken in combination with said known fixed magnitude of timing displacement will represent an accurate measure of the unknown magnitude of timing displacement.

13. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that said undesired signal components are brought into timing agreement;

a delay network including a magnetic drum mounted for movement about its axis of rotation, a first recording means positioned on the periphery of said drum for recording said second signal on said drum, a first playback means positioned on the periphery of said drum at a fixed peripheral displacement from said first recording means for receiving a version of said second signal which is being delayed by a fixed magnitude of time, a second recording means positioned on the periphery of said drum for recording a first signal version of said first signal on said drum, a second playback means associated with and displaced on the periphery of said drum from said second recording means for receiving said first signal version, said second playback means being mounted for movement about the periphery of said drum so that said first signal version is delayed by a controllable magnitude of time greater than said fixed magnitude of time, a third recording means positioned on the periphery of said drum and connected in series with said second recording means for recording a second signal version of said first signal on said drum, a third playback means associated with and displaced on the periphery of said drum from said third recording means for receiving said second signal version, said third recording means being mounted for movement about the periphery of said drum such that said second signal version is delayed by the controllable magnitude of time less than said fixed magnitude of time, coupling means connected to said second playback means and said third recording means for providing means for selectively changing said controllable magnitude of time such that the desired signal components of a first one of said signal versions and said version of said second signal may be brought into timing agreement;

means for shifting the phase of substantially all monofrequency components of said version of said second signal by 90°;

means for correlating said first signal version with said version of said second signal to develop a first output signal;

means for correlating said second signal version with said version of said second signal to develop a second output signal;

means for subtracting said output signals to develop a remainder signal the magnitude of which represents a measure of the timing displacement between the desired signal components of said first one of said signal versions and said version of said second signal;

servo control means responsive to said remainder signal for selectively controlling said coupling means such that the desired signal components of said first one of said signal versions and said version of said second signal will be continuously in timing agreement; and means for measuring said controllable magnitude of time such that when the desired signal components of said first one of said signal versions and said version of said second signal are in timing agreement, said controllable magnitude of time when taken in combination with said known fixed magnitude of timing displacement will represent an accurate measure of the unknown magnitude of timing displacement.

14. A measuring system for measuring an unknown magnitude of timing displacement between a desired signal component of a first time-varying electrical signal and a mutually coherent desired signal component of a second time-varying electrical signal, where said first and second signals include undesired signal components which are mutually coherent and displaced by a known fixed magnitude of timing displacement, comprising in combination:

means for delaying a one of said signals such that the undesired signal components are in timing agreement;

a delay network including a magnetic drum mounted for movement about its axis of rotation, a first recording means positioned on the periphery of said drum for recording said second signal on said drum, a first playback means positioned on the periphery of said drum at a fixed peripheral displacement from said first recording means for receiving a version of said second signal which is being delayed by a fixed magnitude of time, a second recording means positioned on the periphery of said drum for recording a first signal version of said first signal on said drum, a second playback means associated with and displaced on the periphery of said drum from said second recording means for receiving said first signal version, said second playback means being mounted for movement about the periphery of said drum so that said first signal version is delayed by a controllable magnitude of time greater than said fixed magnitude of time, a third recording means positioned on the periphery of said drum and connected in series with said second recording means for recording a second signal version of said first signal on said drum, a third playback means associated with and displaced on the periphery of said drum from said third recording means for receiving said second signal version, said third recording means being mounted for movement about the periphery of said drum such that said second signal version is delayed by the controllable magnitude of time less than said fixed magnitude of time, coupling means connected to said second playback means and said third recording means for providing means for selectively changing said controllable magnitude of time such that the desired signal components of a first one of said signal versions and said version of said second signal may be brought into timing agreement;

means for delaying said first signal version by a fixed magnitude of time to develop a first delay signal;

means for correlating said first delay signal with said version of said second signal to develop a first output signal;

means for delaying said second signal by the fixed magnitude of time to develop a second delay signal;

means for correlating said second delay signal with said first signal version to develop a second output signal;

means for correlating said second delay signal with said second signal version to develop a third output signal;

means for delaying said second signal version by the fixed magnitude of time to develop a third delay signal;

means for correlating said third delay signal with said version of said second signal to develop a fourth output signal;

means for subtracting said first and second output signals to develop a first remainder signal;

means for subtracting third and fourth output signals to develop a second remainder signal;

means for subtracting said first and second remainder signals to develop a control signal, the magnitude of which represents the timing displacement between the desired signal component of a first one of said signal versions and said version of said second signal;

servo control means responsive to said control signal for selectively controlling said coupling means such that the desired signal components of said first one of said signal versions and said version of said second signal will be continuously in timing agreement; and means for measuring said controllable magnitude of time such that when the desired signal components of said first one of said signal versions and said version of said second signal are in timing agreement, said controllable magnitude of time when taken in combination with said known fixed magnitude of timing displacement will represent an accurate measure of the unknown magnitude of timing displacement.

15. A measuring system for measuring the magnitude of timing displacement between a desired signal component of a first time-varying electrical signal and a mutually coherent desired signal component of a second time-varying electrical signal, where said first and second signals include mutually coherent undesired signal components which are displaced by a known fixed magnitude of timing displacement, comprising in combination:

means for delaying a one of said signals such that the undesired signal components are in timing agreement;

a delay network including a magnetic drum mounted for movement about its axis of rotation, a first recording means positioned on the periphery of said drum for recording said second signal on said drum, a first playback means positioned on the periphery of said drum at a fixed periphery displacement from said first recording means for receiving a version of said second signal which is being delay by a fixed magnitude of time, a second recording means positioned on the periphery of said drum for recording a first signal version of said first signal on said drum, a second playback means associated with and displaced on the periphery of said drum from said second recording means for receiving said first signal version, said second playback means being mounted for movement about the periphery of said drum so that said first signal version is delayed by a controllable magnitude of time greater than said fixed magnitude of time, a third recording means positioned on the periphery of said drum and connected in series with said second recording means for recording a second signal version of said first signal on said drum, a third playback means associated with and displaced on the periphery of said drum from said third recording means for receiving said second signal version, said third recording means being mounted for movement about the periphery of said drum such that said second signal version is delayed by the controllable magnitude of time less than said fixed magnitude of time, coupling means connected to said second playback means and said third recording means for providing means for selectively changing said controllable magnitude of time such that the desired signal components of a first one of said signal versions and said version of said second signal may be brought into timing agreement;

means for modulating at a reference timing rate said controllable magnitude of time such that the timing of said signal versions will vary over like ranges of time values about said controllable magnitude of time;

means for correlating said first signal version with said version of said second signal to develop a first output signal;

means for correlating said second signal version with said version of said second signal to develop a second output signal;

means responsive to said output signals for developing a control signal the magnitude and polarity of which represents a measure of the timing displacement between the desired signal components of said first one of the signal versions and said version of said second signal;

servo control means responsive to said control signal for selectively controlling said coupling means such that the desired signal components of said first one of said signal versions and said version of said second signal will be continuously in timing agreement; and means for measuring the controllable magnitude of time such that when the desired signal components of said first one of said signal versions and said version of said second signal are in timing agreement, said controllable magnitude of time when taken in combination with said known fixed magnitude of timing displacement will represent an accurate measure of the unknown magnitude of timing displacement.

(References on following page)

References Cited by the Examiner

UNITED STATES PATENTS

| | | | |
|---|---|---|---|
| 2,166,991 | 7/1939 | Guanella | 343—100.7 |
| 2,253,975 | 8/1941 | Guanella | 343—100.7 |
| 2,622,150 | 12/1952 | Coulter et al. | 340—170 X |
| 2,683,254 | 7/1954 | Anderson et al. | |
| 2,800,654 | 7/1957 | De Rosa | 343—106 |
| 2,866,373 | 12/1958 | Doyle et al. | 235—181 |
| 2,907,400 | 10/1959 | Swafford | 324—77 X |

FOREIGN PATENTS

| | | |
|---|---|---|
| 495,515 | 6/1938 | Great Britain. |

WALTER L. CARLSON, *Primary Examiner.*

SAMUEL BERNSTEIN, MAYNARD R. WILBUR,
*Examiners.*

J. B. MILSTEAD, M. J. LYNCH, *Assistant Examiners.*